US007000243B1

(12) United States Patent
Fenwick, Jr. et al.

(10) Patent No.: US 7,000,243 B1
(45) Date of Patent: Feb. 14, 2006

(54) ALLOCATING COMPUTER RESOURCES WITHIN A VIDEO DISTRIBUTION SYSTEM

(75) Inventors: Richard C. Fenwick, Jr., San Jose, CA (US); Donald W. Power, San Jose, CA (US); Brian G. Barnett, Castro Valley, CA (US); John T. Miner, San Jose, CA (US)

(73) Assignee: OnCommand Corporation, San Jose, CA (US)

( * ) Notice: Subject to any disclaimer, the term of this patent is extended or adjusted under 35 U.S.C. 154(b) by 0 days.

(21) Appl. No.: 09/224,409

(22) Filed: Dec. 31, 1998

(51) Int. Cl.
*H04N 7/18* (2006.01)

(52) U.S. Cl. .......................... 725/74; 725/78; 725/80; 725/82; 725/86

(58) Field of Classification Search ................ 725/78, 725/80, 85–87, 91–94, 103, 104, 74, 83, 725/114, 82
See application file for complete search history.

(56) References Cited

U.S. PATENT DOCUMENTS

| 3,833,757 A | 9/1974 | Kirk, Jr. et al. ............. 178/5.6 |
| 3,942,117 A | 3/1976 | Cunningham ................ 325/161 |
| 3,944,742 A | 3/1976 | Cunningham ............. 178/66 R |
| 3,952,298 A | 4/1976 | Winkelmann et al. .................... 340/347 DD |
| 4,057,829 A | 11/1977 | Moorehead ................... 358/86 |
| 4,090,220 A | 5/1978 | Gargini ........................ 358/86 |
| 4,156,847 A | 5/1979 | Tazawa et al. .............. 325/308 |
| 4,191,968 A | 3/1980 | Kirk, Jr. ...................... 358/141 |
| 4,215,370 A | 7/1980 | Kirk, Jr. ...................... 358/146 |
| 4,343,042 A | 8/1982 | Schrock et al. ................. 455/5 |
| 4,360,828 A | 11/1982 | Briggs, Jr. et al. ............ 358/86 |
| 4,361,730 A | 11/1982 | Barber et al. ............... 179/5 R |
| 4,365,249 A | 12/1982 | Tabata ..................... 340/825.3 |
| D271,220 S | 11/1983 | Fox et al. ..................... D21/48 |
| 4,430,731 A | 2/1984 | Gimple et al. ................ 370/30 |
| 4,450,477 A | 5/1984 | Lovett |
| 4,455,570 A | 6/1984 | Saeki et al. ................... 358/86 |
| 4,484,277 A | 11/1984 | Uesugi ....................... 364/405 |
| 4,491,983 A | 1/1985 | Pinnow et al. ............. 455/612 |
| 4,530,008 A | 7/1985 | McVoy ....................... 358/123 |
| 4,574,305 A | 3/1986 | Campbell et al. ............. 358/86 |
| 4,575,750 A | 3/1986 | Callahan ...................... 358/86 |
| 4,584,603 A | 4/1986 | Harrison ...................... 358/86 |
| 4,633,462 A | 12/1986 | Stifle et al. ................... 370/85 |
| D288,926 S | 3/1987 | Zierhut et al. .............. D14/84 |
| 4,694,490 A | 9/1987 | Harvey et al. ................ 380/20 |
| 4,751,578 A | 6/1988 | Reiter et al. ................ 358/183 |
| 4,829,560 A | 5/1989 | Evanyk et al. ............. 379/106 |
| 4,947,244 A | 8/1990 | Fenwick et al. .............. 358/86 |
| 4,985,761 A | 1/1991 | Adams ........................ 358/84 |

(Continued)

*Primary Examiner*—Ngoc K. Vu
(74) *Attorney, Agent, or Firm*—Baker Botts LLP (57) ABSTRACT

A method and system for video distribution among a plurality of users uses a host computing device that allocates tasks among a number of audiovisual serving devices. A user can select between traditional video program material, such as scheduled special events and on-demand feature length films, as well as Internet access, video games and computer applications. Assignable Computing Devices (ACDs), one type of audiovisual serving device within the system, are used for a number of functions including providing Internet access to users, controlling the menu-driven process of selecting program material and providing computer applications to users. Other types of audiovisial serving devices provide program material such as on-demand feature length films and video games. The user communicates with the ACDs through an intuitive graphical user interface (GUI) while selecting program material to view through a series of menus, which may be customized according to the preferences of an individual user.

19 Claims, 2 Drawing Sheets

U.S. PATENT DOCUMENTS

| | | | |
|---|---|---|---|
| 4,994,908 A | 2/1991 | Kuban et al. | 358/86 |
| 5,038,211 A | 8/1991 | Hallenbeck | 358/142 |
| 5,045,816 A | 9/1991 | Bramhall et al. | 332/105 |
| 5,077,607 A | 12/1991 | Johnson et al. | 358/86 |
| 5,130,792 A | 7/1992 | Tindell et al. | 358/85 |
| 5,133,079 A | 7/1992 | Ballantyne et al. | 455/4.1 |
| 5,142,690 A | 8/1992 | McMullan, Jr. et al. | 455/6.1 |
| 5,172,413 A | 12/1992 | Bradley et al. | 380/20 |
| D332,260 S | 1/1993 | Letzkus | D14/125 |
| 5,206,722 A | 4/1993 | Kwan | |
| 5,243,415 A | 9/1993 | Vance | 358/86 |
| 5,253,341 A | 10/1993 | Rozmanith et al. | 395/200 |
| 5,270,809 A | 12/1993 | Gammie et al. | 358/84 |
| 5,283,639 A | 2/1994 | Esch et al. | 348/6 |
| 5,294,977 A | 3/1994 | Fisher et al. | 348/4 |
| 5,323,448 A | 6/1994 | Biggs et al. | 379/91 |
| 5,335,277 A | 8/1994 | Harvey et al. | 380/20 |
| 5,408,258 A | 4/1995 | Kolessar | 348/5.5 |
| 5,426,701 A | 6/1995 | Herrmann et al. | 380/52 |
| 5,440,336 A | 8/1995 | Buhro et al. | 348/13 |
| 5,475,740 A | 12/1995 | Biggs, Jr. et al. | 379/91 |
| 5,477,262 A | 12/1995 | Banker et al. | 348/7 |
| 5,485,507 A | 1/1996 | Brown et al. | 379/88 |
| 5,488,411 A | 1/1996 | Lewis | 348/8 |
| 5,519,435 A | 5/1996 | Anderson | 348/8 |
| 5,521,631 A | 5/1996 | Budow et al. | 348/7 |
| 5,523,781 A | 6/1996 | Brusaw | 348/3 |
| 5,548,323 A | 8/1996 | Callahan | 348/9 |
| 5,555,015 A | 9/1996 | Aguayo, Jr. et al. | 348/6 |
| 5,565,908 A | 10/1996 | Ahmad | 348/7 |
| 5,574,964 A | 11/1996 | Hamlin | 455/3.1 |
| 5,579,057 A | 11/1996 | Banker et al. | 348/589 |
| 5,581,270 A * | 12/1996 | Smith et al. | 345/2.1 |
| 5,594,491 A | 1/1997 | Hodge et al. | 387/7 |
| 5,603,078 A | 2/1997 | Henderson et al. | 455/5.1 |
| 5,604,682 A | 2/1997 | McLaughlin et al. | 364/514 A |
| 5,612,730 A | 3/1997 | Lewis | 348/8 |
| 5,625,864 A | 4/1997 | Budow et al. | 455/4.2 |
| 5,634,849 A | 6/1997 | Abecassis | 463/30 |
| 5,636,139 A | 6/1997 | McLaughlin et al. | 364/514 R |
| 5,638,426 A | 6/1997 | Lewis | 379/90 |
| 5,641,319 A | 6/1997 | Stoel et al. | |
| 5,655,008 A | 8/1997 | Futch et al. | 379/91.01 |
| 5,661,517 A | 8/1997 | Budow et al. | 348/13 |
| 5,663,757 A | 9/1997 | Morales | 348/13 |
| 5,664,046 A | 9/1997 | Abecassis | 386/125 |
| 5,671,377 A | 9/1997 | Bleidt et al. | 395/328 |
| 5,703,795 A | 12/1997 | Mankovitz | 364/514 R |
| 5,713,795 A | 2/1998 | Kohorn | 463/17 |
| 5,727,159 A | 3/1998 | Kikinis | 395/200.76 |
| 5,729,549 A | 3/1998 | Kostreski et al. | 370/522 |
| 5,732,216 A | 3/1998 | Logan et al. | 395/200.33 |
| 5,732,398 A | 3/1998 | Tagawa | 705/5 |
| 5,735,744 A | 4/1998 | Okamoto | 463/40 |
| 5,781,734 A * | 7/1998 | Ohno et al. | 395/200.47 |
| 5,850,218 A | 12/1998 | LaJoie et al. | |
| 5,905,942 A * | 5/1999 | Stoel et al. | 455/4.2 |
| 5,931,901 A * | 8/1999 | Wolfe et al. | 709/206 |
| 5,973,684 A | 10/1999 | Brooks et al. | |
| 6,005,561 A | 12/1999 | Hawkins et al. | |
| 6,005,565 A | 12/1999 | Legall et al. | |
| 6,049,823 A | 4/2000 | Hwang | |
| 6,134,594 A | 10/2000 | Helland et al. | |
| 6,148,142 A | 11/2000 | Anderson | |
| 6,301,616 B1 | 10/2001 | Pal et al. | |
| 6,305,020 B1 * | 10/2001 | Hoarty et al. | 725/95 |
| 6,449,654 B1 | 9/2002 | Blackwell et al. | |

* cited by examiner

ALLOCATING COMPUTER RESOURCES WITHIN A VIDEO DISTRIBUTION SYSTEM

BACKGROUND OF THE INVENTION

1. Field of the Invention

The present invention relates to systems for video distribution. More particularly, the present invention relates to a video distribution system utilizing a host computing device that allocates tasks among a number of audiovisual serving devices.

2. The Background

It is common for lodging facilities such as hotels and motels to provide their guests with video programming from cable or broadcast television as well as feature films via on-demand video rentals and/or fixed scheduled movie systems. Providing video programming beyond the cable and broadcast television programming readily available to the public allows the facility to both fulfill a desire of some guests for such programming and generate revenue by charging for the programming.

Recently it has become almost mandatory for travellers to maintain electronic communication with their employees' computers and with e-mail servers in general so that they receive e-mail while on the road. Typically this has been achieved by requiring the traveller to carry a portable computer, modem, server supply and related materials on the road in order to effectuate such communications. Thus, in the past, travellers have been required to either carry a computer with them or find a facility with a computer that can be borrowed.

Prior art systems for video distribution function with fixed and defined video hardware. There is no known prior art system based on a design where a host computing device allocates numerous tasks to audiovisual serving devices such as assignable computing devices. No known prior art systems provides for internet access over a conventional video distribution systems with out the need for a computing device at the terminus of the video distribution systems, e.g., the user's room.

Accordingly, it would be desirable to provide an improved video distribution system based on a host computing device and a number of audiovisual serving devices for distributing program material from a plurality of sources including the internet to users.

SUMMARY OF THE INVENTION

A method and system for video distribution among a plurality of users uses a host computing device that allocates tasks among a number of audiovisual serving devices. The system architecture permits a single host to handle a plurality of simultaneous users and permits the system to be easily scaled up or down in overall size and capacity. A user is able to select between traditional video program material, such as scheduled special events and on-demand feature length films, as well as Internet access, video games and computer applications. Assignable Computing Devices (ACDs), one type of audiovisual serving device within the system, are used for a number of functions including providing Internet access to a user, controlling the menu-driven process of selecting program material and providing computer applications to users. Other types of audiovisual serving devices, which are more specialized than the ACDs, provide program material such as scheduled special events, on-demand feature length films and video games. The user communicates with the ACDs through an intuitive graphical user interface (GUI) while selecting program material to view through a series of menus. These menus are easy to update and tailor to the preferences of an individual user. Internet access is provided by assigning an ACD to the user. Computer inputs are provided by in-room devices connected to the terminus of the video distribution system. Computer outputs are converted to audiovisual signals suitable for display by an in-room monitor such as a television set. In this way a user need not have an in-room computer to obtain internet access and a number of ACDs can provide for the computer needs of a larger number of user's through this dynamic assignment scheme.

DETAILED DESCRIPTION OF THE PREFERRED EMBODIMENTS

Those of ordinary skill in the art will realize that the following description of the present invention is illustrative only and not intended to be in any way limiting. Other embodiments of the invention will readily suggest themselves to such skilled persons after a perusal of the within disclosure.

Figure 1:
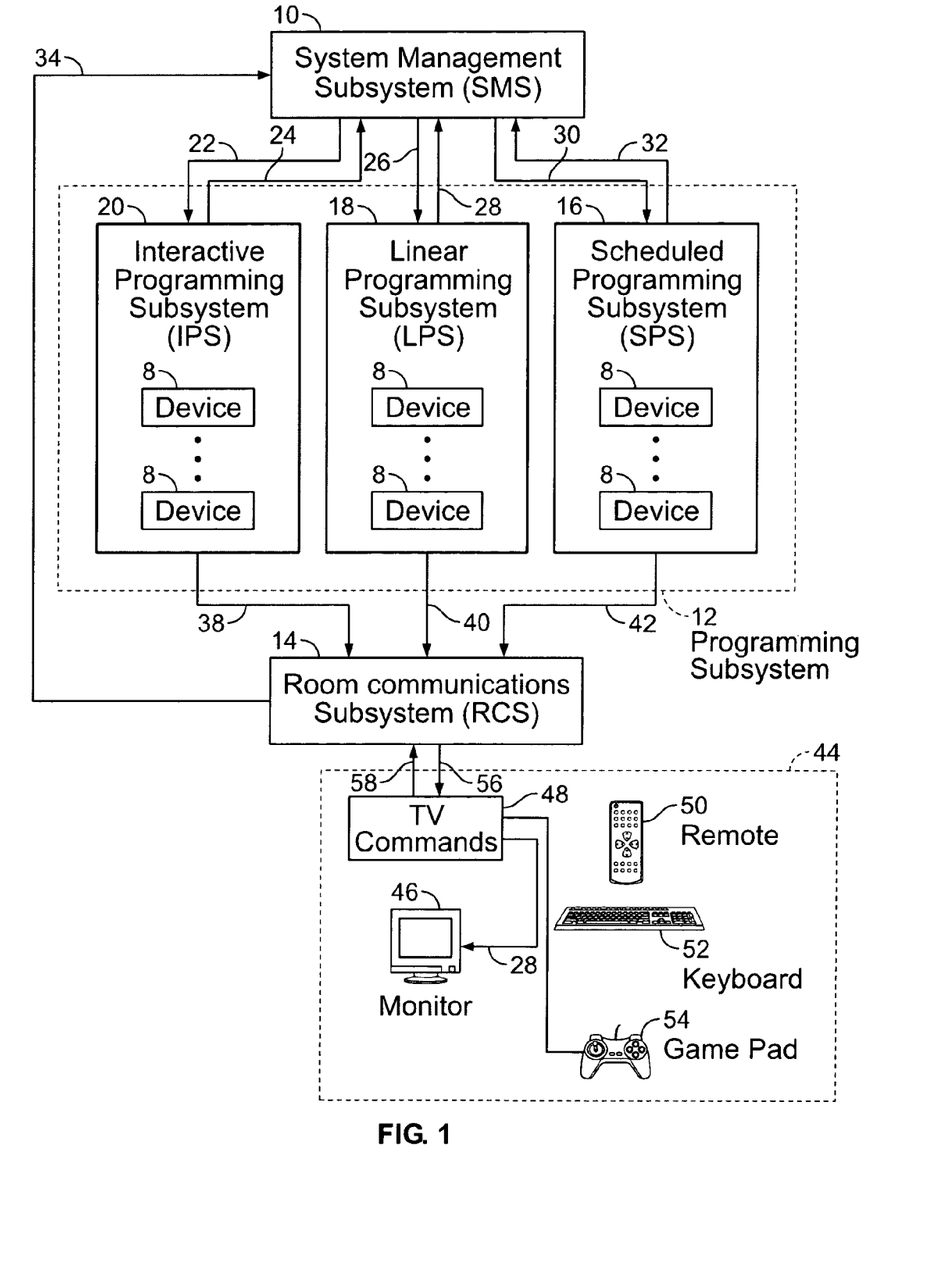
FIG. 1 is a system block diagram showing a presently preferred embodiment of the invention.

The video distribution system for distributing video program material among users of a lodging or similar facility utilizes a host computing device that allocates tasks among a number of audiovisual serving devices. By allocating tasks to the audiovisual serving devices, the host is able to service a plurality of users and provide each user access to a pool of audiovisual serving devices. Referring to FIG. 1, three major components are provide: the central host computer shown as the System Management Subsystem (SMS) 10 for managing the overall system, the programming subsystem 12, which preferably includes numerous audiovisual serving devices 8 which serve as sources of video program material, and the Room Communication Subsystem (RCS) 14 for delivering the program material to the user.

The system delivers to the users a variety of types of program material from a variety of sources. The types of program materials include, but are not limited to, access to the Internet, computers running application software, on-demand feature length and other films, scheduled special events, scheduled video programs, video games and the like. Program material may come from videotapes, satellite and terrestrial broadcasts, the Internet, and material stored on video servers such as a magneto-optical jukebox-type digital video servers and the like. Those of ordinary skill in the art will recognize that the term video server encompasses many types of individual devices known in the art, both analog and digital, including, but not limited to, banks of video tape players, video jukeboxes, magnetic disk arrays storing digital representations of video signals, banks of digital video disk (DVD) players, computing devices capable of outputting audiovisual program material, and the like. The present invention uses a broad definition of audiovisual serving device to include all such devices capable of producing or delivering audiovisual program material to a user.

The SMS 10, or host, manages the overall video distribution system, which includes maintaining data on the system resources, and directing signals between the user and audiovisual serving devices through the RCS 14. The program material distributed to the users is all contained within the individual audiovisual serving devices 8. The SMS 10 directs a particular audiovisual serving device 8 to deliver program material to the user. By allocating the time-intensive tasks of presenting users with program material to the programming subsystem 12, the SMS 10 is able to service a relatively large number of users.

User inputs and interactions with the programming subsystem 12 are made through the Room Communications Subsystem (RCS) 14 at the direction of the SMS 10. That is, the RCS 14 facilitates routing of both the output from an audiovisual serving device to an individual user and user communications, if any, back to the audiovisual serving device and/or the SMS 10 as appropriate. The output of the audiovisual serving device will be an audiovisual (AV) signal that the RCS 14 will direct to the user's monitor. The terms "monitor" and "user's monitor" in the context of this disclosure are intended to include a wide range of displays, such as a TV display in the user's room and similar devices such as video monitors and the like.

The SMS 10 functions as a host computer directing a number of audiovisual serving devices to present program material to the user, as well as managing the overall system operations. In accordance with a presently preferred embodiment of the present invention, the SMS 10 may include a single computing device operating under the control of an operating system such as WINDOWS NT™ available from Microsoft Corporation of Redmond, Wash. However, there is no requirement that any particular type of computing device or any particular operating system be used, as will be recognized by those of ordinary skill in the art. The SMS 10 manages the overall system and allocates tasks by communicating with the programming subsystem 12 using a standard data communications protocol such as TCP/IP socket connections. Those of ordinary skill in the art will recognize that many convenient communications protocols may be utilized, and the present invention is not intended to be limited to the use of TCP/IP socket connections for communications. Through these communications the SMS 10 keeps track of the current system resources and manages the overall system operations. At initialization or power up, each audiovisual serving device opens a TCP/IP socket connection with the SMS 10. After establishing the connection, an initialization message is transmitted to the SMS 10, followed by a response from the SMS 10. Next, the audiovisual serving devices each transmit data to the SMS 10 describing their respective device hardware configurations, whether they are on-line or off-line and the RF communication channel that is assigned to the audiovisual serving device. Through this exchange of signals, the SMS 10 compiles a database of the audiovisual serving devices present in the system. Table 1 lists a set of system commands used to compile this database in accordance with a presently preferred embodiment of the present invention, defining the variables to use and the format of such commands is within the knowledge of those of ordinary skill in the art. Those of ordinary skill in the art will also recognize that many different sets of such commands may be utilized for such communications and the present invention is not intended to be limited to those listed in Table 1.

TABLE 1

System Commands

| Name | Path - FIG. 1 | Description |
| --- | --- | --- |
| INIT | 24, 28 and 32 | Inform SMS that subsystem has been initialized |
| RESP | 22, 26 and 30 | Response to INIT and synchronize the time |
| DISC | 24, 28 and 32 | Subsystem is going off-line |
| PING | 22, 26 and 30 | Verify communications with subsystem |
| SHUT-DOWN | 22, 26 and 30 | Direct subsystem to shutdown |
| TSYN | 22, 26 and 30 | Re-synchronize time |
| MISC | 22, 24, 26, 28, 30 and 32 | General purpose test message |
| VER | 22, 24, 26, 28, 30 and 32 | Verify a command has been properly completed |
| ERR | 24, 28 and 32 | Inform SMS that an error has incurred in the subsystem |

To allow for continued system operations during occasional malfunctions of individual audiovisual serving devices, the SMS 10 sends a communication test message (a conventional "ping" message) after a defined period of time passes without any communications between an audiovisual serving device and the SMS 10. The audiovisual serving device responds by sending a verification message back to the SMS 10 indicating that it is functioning properly, or the SMS 10 is alerted to take action. In accordance with a presently preferred embodiment of the present invention the SMS 10 closes the socket connections of audiovisual serving devices that do not respond after a defined number of pings and updates the data base of currently available system resources. An audiovisual serving device that loses its socket connection resets and periodically attempts to reestablish the socket connection. The audiovisual serving device is added to the database of available system resources after a successful exchange of initialization and response messages between the audiovisual serving devices and the SMS 10. In this way, the SMS 10 not only accounts for audiovisual serving devices added or removed before startup but continuously monitors the system resources. Those of ordinary skill in the art will recognize that the use of ping messages is one of many ways the SMS 10 may monitor and manage the system resources and that the present invention is not intended to be limited to this particular mode of operation.

The SMS 10 continuously keeps track of the currently available system resources. For example, when the SMS 10 directs an audiovisual serving device to provide a videotape to a user, both that particular tape and the audiovisual serving device will no longer be available to other users for the duration of the videotape, plus the time needed to rewind. To track the availability of the audiovisual serving devices and their resources, the present invention uses messages sent from the audiovisual serving device to the SMS 10 noting a change in the status when the audiovisual serving device has started or finished a task, such as playing a particular videotape. The SMS 10 uses this message to update the database of currently available system resources.

The SMS 10 allocates the tasks of providing program material to the users among the various audiovisual serving devices. In accordance with a presently preferred embodiment of the present invention, this is a two step procedure. First, the user is guided through a menu-driven process of selecting and ordering from a list of currently available program material by an audiovisual serving device which is also an Assignable Commuting Device (ACD (discussed in detail below). Second, the program material is provided to the user directly by the audiovisual serving device. In both steps, allocating these tasks to audiovisual serving devices frees the SMS 10 to service other users.

In accordance with a presently preferred embodiment of the present invention, a list of currently available program material available is tracked using titles. The SMS 10 maintains the list. When the system is initialized, the SMS 10 queries the audiovisual serving devices for the available program material. The audiovisual serving devices each respond with a list of titles. These communications are made using a standard data communications protocol such as TCP/IP socket connections. This list of currently available program materials is continuously updated. Information for updates can be compiled through change in status messages sent from the audiovisual serving devices to the SMS 10 or from the audiovisual serving devices to the SMS 10, indicating that a title is in use or is currently available. The list can vary in concert with the available system resources, for example, if all the videotape players are in use presenting program material to other users, then all of the videotape program material would be unavailable to new users. Conversely, if an additional audiovisual serving device is added to the system with new program titles, the list of currently available titles is preferably updated. Commands used to compile an initial list of program material and to keep track of changes, in accordance with a presently preferred embodiment of the present invention, are shown in Tables 2 and 3 respectively. Defining the variables to use and the format of such commands is within the knowledge of those of ordinary skill in the art. Those of ordinary skill in the art will also recognize that many different sets of such commands may be utilized and the present invention is not intended to be limited to those in Tables 2 and 3. In these tables, the abbreviation "PS" is used to designate the programming subsystem 12.

TABLE 2

Title Resources Commands

| Name | Path - FIG. 1 | Description |
| --- | --- | --- |
| QTITLE | 22, 26 and 30 | SMS polls PS for available titles |
| Q1TITLE | 22, 26 and 30 | SMS polls PS for international title information |
| QHARD | 22, 26 and 30 | SMS polls PS for hardware information |
| QSTIL | 22, 26 and 30 | SMS polls PS for schedule information |
| QSTIM | 30 | SMS polls SPS for schedule information |
| QSYS | 22, 26 and 30 | SMS polls a device for current status |
| TINF | 24, 28 and 32 | Return title information |
| ITINF | 24, 28 and 32 | Return international title information |
| DINF | 24, 28 and 32 | Return device configuration information |
| MINE | 24, 28 and 32 | Return device modulator information |
| LINE | 24, 28 and 32 | Return device LonTalk information, for user communictions |
| PINF | 24, 28 and 32 | Return RS232 port setup information |
| SINF | 24, 28 and 32 | Return schedule information for a title |
| SYINF | 24, 28 and 32 | Return device status information |
| CSTATE | 22, 24, 26, 28, 30 and 32 | Change in device status |
| TREQ | 22, 26 and 30 | SMS directs PS to present program material to a user |
| TCTRL | 22, 26 and 30 | SMS informs PS that user stopped or canceled the material |

TABLE 3

Status Commands

| Name | Path - FIG. 1 | Description |
| --- | --- | --- |
| TAVL | 24, 28 and 32 | PS notifies SMS on availability of a title |
| TEND | 24, 28 and 32 | PS notifies SMS a user has completed viewing |
| SSAVL | 22, 24, 26, 28, 30 and 32 | A PS is out of resources, broadcast to system |
| TRES | 24, 28 and 32 | Acknowledge allocation of PS by SMS to present material |
| TPO | 24, 28 and 32 | Free-preview time is over |
| CHARGE | 22, 26 and 30 | Poll PS on charge information for program material |
| CINF | 24, 28 and 32 | Return charge information for program material |
| SCHEDULE | 22, 26 and 30 | SMS allocates PS to present program material at specified time |

The SMS 10 preferably maintains a database on the individual users. This data includes the program material that an individual user views or purchases, and is made available by the SMS 10 for a variety of purposes including billing. In accordance with a presently preferred embodiment of the present invention, user data including previous purchases, a preferred language, a choice of whether or not to block certain program materials such as adult program materials and a choice of whether or not to block pay-per-view program material is used to customize the menus presented to the user.

The programming subsystem 12 provides the selected program material for routing to the user. Referring to FIG. 1, the programming subsystem 12 may include numerous audiovisual serving devices which may be thought of as being divided into three subsystems based on the category of program material each provides. These include the Scheduled Programming Subsystem (SPS) 16 for presenting scheduled program content such as special events, the Linear Programming Subsystem (LPS) 18 for presenting on-demand program content such as feature length films and the Interactive Programming Subsystem (IPS) 20 for presenting interactive program content such as video game applications and menus. Within each of these subsystems (not all of which must be present in a given system) there may be one or more audiovisual serving devices that provide program material to the users, such as a group of digital video servers within the LPS 18, each one with the capacity to simultaneously provide multiple users with on-demand streams of program material.

The present invention preferably uses Assignable Computing Devices (ACDs) as programming subsystem 12 audiovisual serving devices in various applications. For example, in accordance with a presently preferred embodiment of the present invention IBM-compatible personal computers (PCs) are used as ACDs to generate the menus for the user to select program material. This selection is not intended to be limiting, however. In accordance with the present invention, an ACD may be any computing device capable of performing a task assigned to it. Such devices are intended to include, but be limited to, game computing devices such as the NINTENDO 64™ a product of the Nintendo Corporation of Japan and the SONY PLAY STATION™ a product of the Sony Corporation of Japan, Apple-based personal computers available from Apple Computer Corp. of Cupertino, Calif., UNIX-based computers available from a number of vendors, single-purpose application devices such as computing chips with pre-programmed application programs loaded from read-only memory (ROM), and the like.

The present invention treats presenting menus for the user to select program material as a special mode of presenting program material. This task is inherently interactive and is allocated to the IPS 20. The menu selection process includes presenting the user with a set of menus using a graphical user interface (GUI), and accepting user inputs that will interactively step the user through viewing the list of program material and allow the user to make a selection. The information for generating these menus, such as the currently available system resources, is maintained by the SMS 10 and used by or passed to the ACD audiovisual serving device. The menus may be written in Hypertext Markup Language (HTML) or any other convenient programming language. The use of HTML makes the individual menus particularly easy to update. The result of the menu selection process is a title, or other such identification, of the program material the user wishes to view.

Given the title of the program material, the SMS 10 allocates the task of presenting the program material to a particular audiovisual serving device within the programming subsystem 12, which will then operate with the RCS 14 to route the selected material to the user. During the period of time that the program material is being presented to the user and other times when the user is in communication with device other than the SMS 10, the SMS 10 is free to service other users. Those of ordinary skill in the art will notice that it is also possible to use the same ACD that provided the menus to the user to handle the allocations of the task of presenting the program material to the user by causing an appropriate audiovisual serving device to present the selected program material rather than queuing the request through the SMS 10.

The three subsystems of the programming subsystem 12, the SPS 16, LPS 18 and IPS 20 differ in the type of programming material each contains, which defines the interaction each generally expects with the user. For each, the identity of the user and the program material are known from the menu selection process and these are passed as described above to an audiovisual serving device that has been allocated to presenting the material to the user. This same information is used by the RCS 14 to facilitate routing graphical displays and communications between the user and the audiovisual serving device.

The SPS 16 delivers real-time or scheduled program content. The content may include out-of-market sports events, special events and other scheduled programs. This type of programming is often regionally or nationally distributed. The source of program material delivered by the SPS 16 may include terrestrial broadcast, local cable television and satellite-delivered programming such as DirecTV™, C-band satellite program feeds and the like. In accordance with a presently preferred embodiment of the present invention, the SPS 16 program material does not include the traditional free-to-guest programming which may be provided to the guest free by not invoking the video distribution system.

Each SPS 16 audiovisual serving device, like the other audiovisual serving devices, sends data to the SMS 10 when the video distribution system is initialized or a new socket connection is established between the audiovisual serving device and the SMS 10. This data preferably includes a list of the available program material titles, program material start and end times, the identification of the communications channel assigned to it and the current audiovisual serving device configuration. The list of available program material is used to generate menus for selection by users. The program material scheduled start and end times are also reflected in menus. The identification of the assigned communications channel is used by the RCS 14 to route the AV signal to the user's monitor. The device configuration specifies that the particular device is a SPS 16 audiovisual serving device and it's operating characteristics that differ from those of other "generic" SPS 16 audiovisual serving devices. For example, some SPS 16 audiovisual serving devices may be configured to deliver a fixed schedule of program material to the user, without allowing the user to "switch channels." Others, such as those SPS 16 audiovisual serving devices that supply out-of-market sports events programming, may be configured to allow a user to switch among a number of sports events for a predetermined amount of time. For this later configuration, the user communicates with the SPS 16 audiovisual serving device, directing it to switch among the sports events. This communication is conducted through the RCS 14.

In accordance with one embodiment of the present invention, the menu information for the SPS 16 program material includes dynamic titles. A channel of a satellite may be dedicated to updating the schedule of program material, such as including information that a sports event is delayed due to rain. This updated schedule is then reflected in the menus presented to users.

The LPS 18 delivers linear program content. Typically, this subsystem works in a video-on-demand basis. The LPS 18 content is characterized by the deterministic, "start-to-finish" nature of its playback. Program content may take the form of feature length films, short programs, advertisements and other video programming. In accordance with one embodiment of the present invention, the LPS 18 maintains data fields of start and end dates for the program material. When the current date is outside the range of those start and end dates the LPS 18 does not include the program material in the list of current titles data passed to the SMS 10. This feature is intended to add flexibility in supplying LPS 18 program material to a facility, program material can be delivered and loaded on the audiovisual serving devices outside of the dates the facility is licensed to present it to users.

The LPS 18 operation begins when the SMS 10 directs that a specific title be presented to the user. The LPS 18 generally requires little or no communication between the audiovisual serving device and the user once the delivery of program material begins. Those of ordinary skill in the art will recognize that storage and playback of program material on an audiovisual serving device can take many forms and use many formats, such as MPEG-2 and the like, however the present invention is not intended to be limited to any particular data storage device or compression format.

In accordance with a presently preferred embodiment of the present invention, the LPS 18 system is used to store and playback "broadcast channels" or initial menus that are presented to the user when the system is activated in the user's room. The broadcast channels are preferably customized for each facility, to advertise the available features and any other information a facility wishes to convey to guests. In accordance with one embodiment of the present invention, multiple broadcast channels are stored on the LPS 18, with the one presented to a particular guest determined by data such as a preferred language and/or whether or not the guest has requested the blocking of any program material, and if a guest is attending a conference at the facility. Those of ordinary skill in the art will recognize that presenting a broadcast channel to the user is not functionally necessary, only that there must be a means for the user to turn the system on. Effectively, the initial menu is an "on" switch, which is preferably presented with advertising material in the form of a broadcast channel. For example, the system could come up and play the broadcast channel advertising available feature length films and instructing the user to press a "menu" button on the remote control in order to select one for viewing. Those ordinary skill in the art will recognize that a number of different approaches could also be used.

The IPS 20 delivers interactive program content. This program interactive content preferably includes Internet access, video game applications, computer applications and a system of menus for a user to select program material. The IPS 20 operations are started with a message from the SMS 10 directing a particular title be presented to a user. The RCS 14 then relays communications between the audiovisual serving device and the user and delivers the AV signal to the user. The IPS 20 program material typically requires near-real-time two-way communication with the user.

In accordance with one embodiment of the present invention, two types of devices are used for the IPS 20 audiovisual serving devices. Game computers may be used for presenting video game applications and IBM-compatible personal computers (PC) may be used as ACDs for other interactive program material. Both devices use the user's monitor to display information. Preferably, each guest room is supplied with a gamepad 54 for use with the game computer and a keyboard 52 for use with the PC. In accordance with a presently preferred embodiment of the preferred invention, the IPS 20 video game audiovisual serving devices maintain data fields of start and end dates for the program material. When the current date is outside the range of those start and end dates the IPS 20 video game audiovisual serving devices do not include the program material in the list of currently titles data passed to the SMS 10.

Access to the Internet is another type of program material provided by the IPS 20 using ACDs. The ACD establishes a connection to the Internet, through any number of conventional means such as by modem, direct internet connection, ISDN connection, satellite internet connection and x DSL connection, to name a few, and by routing signals through the RCS 14 allows the user to access the Internet with the ACD serving us the user's client machine. The monitor in the user's room presents a display, such as a web page the user has selected to view, and the user controls the display using the in-room communications control device. For example, text and directional commands may be entered through the keyboard. Internet access may therefore be provided to users without the need for any in-room computing device provided by the user or by the facility.

In accordance with a recently preferred embodiment of the present invention, when a user is provided access to the Internet, the system modifies web pages and the browser to enhance usability with NTSC-TV monitors. This is done because the typical monitor in a lodging facility lacks the display resolution most PC users expect. These modifications include: increasing the font size of web pages to a predetermined minimum, replacing white backgrounds with a level of gray to reduce contrast thus reducing flicker and enlarging boxes for displaying text (such as passwords and URLs) with enlarged font sizes. With higher resolution HDTV monitors, this additional processing may prove unnecessary. The browser application provided to the user may be configured to accept conventional "plug-in" applications as known to those of skill in the art.

The IPS 20 ACD audiovisual serving devices also provide program material that may include computer applications programs. A number of computer applications such as word processors and spreadsheets would preferably reside on an ACD. The present invention may also include computer applications that in turn play material at the request of a user, such as applications to play compact disks (CDs) or the like. However, the present invention is not intended to be limited to any particular type of computer application program. A user selection of an application would cause a title to be sent by the SMS 10, allocating an ACD to present the application to the user. Communications and the AV signals are relayed by the RCS 14 in a manner similar to other program material. In accordance with a preferred embodiment of the present invention, the computer applications and capabilities available for use by the user would be carefully selected to prevent unauthorized access into system files.

The RCS 14 is the third major component of the video distribution system, it facilitates the delivery of the program material from a particular audiovisual serving device in the programming system 12 to the user. Program material coming from the programming subsystem 12 is in the form of streams of audiovisual (AV) data typically including an audio component and a video component, although both are not required and more than one instance of an audio component and/or a video component may be present. Each of these streams of AV data is the output of a single audiovisual serving device, and is preferably connected to a unique RF modulator assigned to that audiovisual serving device and providing a television output signal on a selected RF frequency. Typically, the frequencies used are in the UHF portion of the television band, but any convenient frequency may be used including new HDTV allocated frequencies. This direct connection of an RF modulator to each audiovisual serving device removes the need for a crosspoint switch. The audiovisual serving device outputs are a set of AV signals each modulated to a selected TV channel of a particular RF frequency, combined and distributed to the monitors of the users over the RCS 14. Note that while this is an advantage of the present invention, there is no requirement that each audiovisual serving device be provided with an independent RF modulator for each output channel and a cross-point switch could still be used to connect a plurality of audiovisual serving devices with RF modulators.

The RCS 14 routes the modulated program material to the user and acts as a conduit for all direct communications with the user. The SMS 10 directs the RCS 14 where to route the signal. Typically, there will be numerous users using the system at a given time. The RCS 14 relays the communications between the various users and the various audiovisual serving devices in the programming subsystem 12, and relays the AV signals to the user's monitor, under the direction of the SMS 10. The program material is preferably modulated to a particular frequency range by RF modulators associated with the audiovisual serving device that provides the material, and distributed through a trunk distribution system to all rooms connected to the system. The RCS 14 tunes the user's monitor to the correct "channel" to view the program material from the correct audiovisual serving device. The RCS 14 preferably includes a remote control device 50, keyboard device 52 and gamepad 54 in the user's room. Communication signals between these devices and the audiovisual serving device are necessary in many contexts. In parallel with relaying the AV signal to the user's monitor, the RCS 14 relays the communication signals between these devices and the programming subsystem 12 in a conventional manner such as by modulating a signal onto a carrier inserted onto the coaxial (or other) distribution line coming into the user's room. The modulation technique can be any convenient scheme such as frequency shift keying (FSK), phase shift keying (PSK), frequency modulation (FM), packet, and the like. The distribution line can be a coaxial cable, a wireless distribution link, or other distribution link as would be known to those of ordinary skill in the art.

Figure 2:
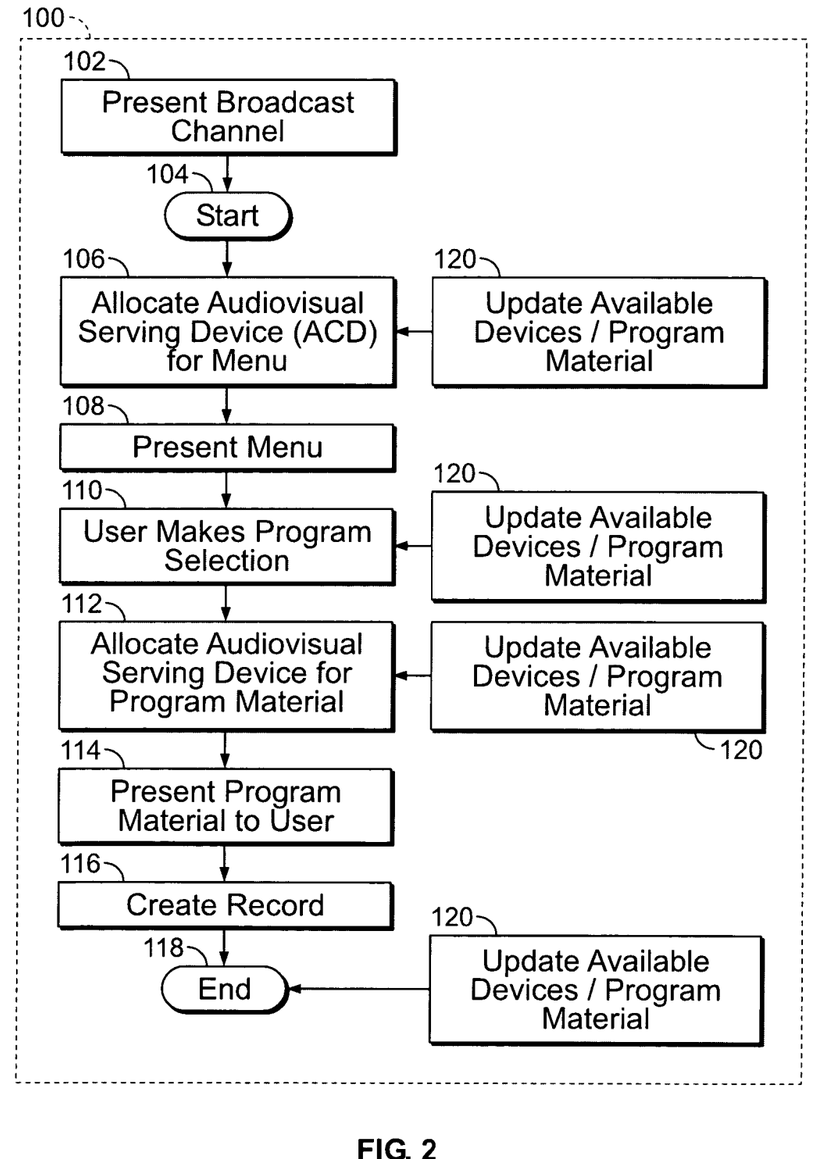
FIG. 2 is a flow diagram showing a process in accordance with a presently preferred embodiment of the invention.

Referring to FIG. 2, a flow chart of the process 100 in accordance with a presently preferred embodiment of the present invention is shown. The presentation of a broadcast channel on the user's monitor 102 precedes the user indicating a desire to access the system 104. The SMS 10 allocates a programming subsystem 12 audiovisual serving device ACD to present the user with a set of menus 106 and removes that audiovisual serving device from a list of available audiovisual serving devices 120. The audiovisual serving device then presents the menus to the user 108, for the user to select program material 110 and passes the title of the program material to the SMS 10. The audiovisual serving device that provided the menu is then available for other tasks, and this is reflected in the updating of the list of available audiovisual serving devices 120. Based on the program material selected, the SMS 10 allocates an audiovisual serving devices to present the material to the user 112, and again updates the list of available audiovisual serving device 120. The audiovisual serving device presents the program material to the user 114 and creates a record of doing so 116. When the user has completed viewing the program material 118, the audiovisual serving device providing the material is made available for other tasks and this information is reflected in the list of available audiovisual serving devices. In each instance of updating the list of available audiovisual serving devices, a list of available program material is contemporaneously updated.

While embodiments and applications of this invention have been shown and described, it would be apparent to those skilled in the art, after a perusal of this disclosure, that many more modifications than mentioned above are possible without departing from the inventive concepts herein. The invention, therefore, is not to be restricted except in the spirit of the appended claims.

What is claimed is:

1. A method for presenting program material from a plurality of program sources to users using a host computing device and allocating tasks among a plurality of audiovisual serving devices, said method comprising:
   responding to a user request to order program material by selecting one of a plurality of Assignable Computing Devices, said selected Assignable Computing Device being used to generate a menu listing available program material;
   presenting the user with said menu over a Room Communication Subsystem;
   receiving a selection of program material from the user over the Room Communication Subsystem;
   responding to said selection of program material by selecting one of a plurality of audiovisual serving devices to present the program material;
   creating a set of user data, said set of user data listing stated user preferences, and
   presenting the program material to the user over the Room Communication Subsystem;
   wherein said menu listing available program material is generated for display in a web browser and is customized based on said user preferences.

2. A method in accordance with claim 1 wherein said menu is modified to reflect said set of user data.

3. The method of claim 1, wherein the menu generated is automatically customized based on information related to the user.

4. The method of claim 1, wherein the menu generated is customized upon the request of the user.

5. A method for presenting program material from a plurality of program sources to users using a host computing device and allocating tasks among a plurality of audiovisual serving devices, said method comprising:
   responding to a user request to order program material by selecting one of a plurality of Assignable Computing Devices, said selected Assignable Computing Device being used to generate a menu listing available program material;
   presenting the user with a broadcast channel;
   presenting the user with said menu over a Room Communication Subsystem;
   receiving a selection of program material from the user over the Room Communication Subsystem;
   responding to said selection of program material by selecting one of a plurality of audiovisual serving devices to present the program material; and
   creating a set of user data, said set of user data listing stated user preferences, and
   presenting the program material to the user over the Room Communication Subsystem;
   wherein said menu listing available program material is generated for display in a web browser and is customized based on said user preferences.

6. A method in accordance with claim 5 wherein said broadcast channel is modified to reflect said set of user preferences.

7. The method of claim 5, wherein the menu generated is automatically customized based on information related to the user.

8. The method of claim 5, wherein the menu generated is customized upon the request of the user.

9. A method for presenting program material from a plurality of program sources to users using a host computing device and allocating tasks among a plurality of audiovisual serving devices, said method comprising:
   responding to a user request to order program material by selecting one of a plurality of Assignable Computing Devices, said selected Assignable Computing Device being used to generate a menu listing available program material;
   presenting the user with said menu over a Room Communication Subsystem;
   receiving a selection of program material from the user over the Room Communication Subsystem;
   responding to said selection of program material by selecting one of a plurality of audiovisual serving devices to present the program material creating a set of user data, said set of user data listing stated user preferences;
   presenting the program material to the user over the Room Communication Subsystem; and
   polling the audiovisual serving device for status after a first defined interval of time;
   wherein said menu listing available program material is generated for display in a web browser and is customized based on said user preferences.

10. A method in accordance with claim 9 wherein the audiovisual serving device is restarted in response to instructions from the host after a second defined interval of time.

11. The method of claim 9, wherein the menu generated is automatically customized based on information related to the user.

12. The method of claim 9, wherein the menu generated is customized upon the request of the user.

13. An apparatus for presenting program material from a plurality of program sources to users using a host computing device and a plurality of audiovisual serving devices, comprising:

a programming subsystem, said programming subsystem including a plurality of audiovisual serving devices;

a Room Communication Subsystem, said Room Communication Subsystem connecting a plurality of user terminals to the system;

a Site Management Subsystem; and a plurality of Assignable Computing Device audiovisual serving devices;

wherein said audiovisual serving devices communicate with the user terminals over said Room Communication Subsystem, said Site Management Subsystem can assign at least one Assignable Computing Device to communicate with a user terminal in response to an initial communication from a user terminal; a set of user data is stored, said user data listing stated user preferences, and further wherein a menu responsive to a list of currently available program material may be generated by said assigned Assignable Computing Device, said menu including at least HTML code, and wherein said menu is customized based on user preferences.

14. The apparatus of claim 13, wherein the menu generated is automatically customized based on information related to the user.

15. The apparatus of claim 13, wherein the menu generated is customized upon the request of the user.

16. An apparatus for presenting program material from a plurality of program sources to users using a host computing device and a plurality of audiovisual serving devices, comprising:

a programming subsystem, said programming subsystem including a plurality of audiovisual serving devices;

a Room Communication Subsystem, said Room Communication Subsystem connecting a plurality of user terminals to the system;

a Site Management Subsystem;

a plurality of Assignable Computing Device audiovisual serving devices; and a broadcast channel;

wherein said audiovisual serving devices communicate with the user terminals over said Room Communication Subsystem, said Site Management Subsystem can assign at least one Assignable Computing Device to communicate with a user terminal in response to an initial communication from a user terminal, a menu is generated using said assigned Assignable Computing Device, said menu including at least HTML code, and a set of user data is stored, said user data listing stated user preferences, and wherein said menu is customized based on said user preferences.

17. An apparatus in accordance with claim 16 wherein said broadcast channel is responsive to said set of user data.

18. The apparatus of claim 16, wherein the menu generated is automatically customized based on information related to the user.

19. The apparatus of claim 16, wherein the menu generated is customized upon the request of the user.

* * * * *